United States Patent

Takizawa

[11] Patent Number: 5,811,134
[45] Date of Patent: Sep. 22, 1998

[54] INJECTION MOLDING MACHINE

[75] Inventor: Michiaki Takizawa, Nagano, Japan

[73] Assignee: Nissei Plastic Industrial Co., Ltd., Nagano-ken, Japan

[21] Appl. No.: 891,722

[22] Filed: Jul. 14, 1997

Related U.S. Application Data

[63] Continuation of Ser. No. 552,495, Nov. 9, 1995, abandoned.

[30] Foreign Application Priority Data

Nov. 10, 1994 [JP] Japan .................................. 6-303226

[51] Int. Cl.$^6$ .................................................. B29C 45/76
[52] U.S. Cl. ........................ 425/145; 264/40.1; 425/149; 425/160; 425/161; 425/169
[58] Field of Search ..................................... 425/130, 162, 425/166, 169, 160, 161, 145, 171, 146, 149; 264/40.1; 364/469.01

[56] References Cited

U.S. PATENT DOCUMENTS

| | | | |
|---|---|---|---|
| 4,328,549 | 5/1982 | Avery ....................................... | 364/469 |
| 4,842,801 | 6/1989 | Kamiguchi et al. ..................... | 425/166 |
| 4,975,227 | 12/1990 | Kamiguchi ............................. | 264/40.1 |
| 5,002,708 | 3/1991 | Inaba et al. ............................. | 264/40.1 |
| 5,225,122 | 7/1993 | Inaba et al. ............................. | 264/40.1 |
| 5,251,146 | 10/1993 | Neko et al. .............................. | 425/162 |
| 5,295,800 | 3/1994 | Nelson et al. ........................... | 425/130 |
| 5,342,559 | 8/1994 | Kamiguchi et al. ................... | 264/40.1 |
| 5,549,857 | 8/1996 | Kamiguchi et al. ................... | 425/170 |

FOREIGN PATENT DOCUMENTS

| | | |
|---|---|---|
| 3-207628 | 9/1991 | Japan . |
| 5-12136 | 2/1993 | Japan . |

Primary Examiner—Patrick Ryan
Assistant Examiner—Iurie A. Schwartz
Attorney, Agent, or Firm—Birch, Stewart, Kolasch & Birch, LLP

[57] ABSTRACT

An injection molding machine in accordance with the present invention includes a storing function portion 2 composed of a first memory portion M1 for storing in advance a standard program Ps that becomes standard of a sequence program and a second memory portion M2 having one or more memory areas into which a user program Pu . . . to be interrupted into the standard program Ps can be written, a user program making portion 3 that can make the user program Pu . . . by indicating a process of making the user program Pu interrupt into the standard program Ps, and a controlling function portion 4 for writing the made user program Pu . . . into the memory area in the second memory portion M2 and executing both of the standard program Ps and the user program Pu . . . interrupted into the standard program Ps at the time of the molding operation. As a result, a user can make on occasion an original user program to which his know-how and the like are added, obtain a high quality molding which he desires, and also perform a programming easily and with a low cost by using the user's own injection molding machine.

10 Claims, 5 Drawing Sheets

INJECTION MOLDING MACHINE

This application is a continuation of application Ser. No. 08/552,495 filed Nov. 9, 1995, now abandoned

BACKGROUND OF THE INVENTION

1. Field of the Invention

The present invention relates to an injection molding machine for controlling an operation in each of portions based on a sequence program stored in advance.

2. Description of the Relevant Art

Up to now, in an injection molding machine of performing a molding in such a way that a molten resin is injected from an injecting apparatus to a mold and filled thereto, as disclosed in Japanese Patent Application Laying Open (KOKAI) No. 3 (1991)-207628, Japanese Patent Application Laying Open (KOKAI) No. 5 (1993)-12136 and the like, a sequence program is stored in advance in a storing portion, such as a ROM and the like built in a controller. Then, various molding operations, for example, an operation in relation to a mold clamping process, an operation in relation to a forward or backward action of the injecting apparatus, an operation in relation to an injecting process, an operation in relation to a measuring process and the like are controlled based on the sequence program at the time of the molding.

By the way, an injection molding machine can perform a series of molding operations, if basic molding conditions are set. However, normally, there are many cases that the molding conditions are slightly affected by a shape of a mold (molding product), a type of a material and the like, and respective molding conditions are affected to each other.

Therefore, for example, even if a mold temperature and a holding pressure are set as molding conditions, an internal pressure in the mold is increased, as the mold temperature is increased, so that it is necessary to change the holding pressure in response to the mold temperature, in a case where it is desirable to keep the internal pressure of the mold constant. A type of such a control varies according to a shape of the mold, a type of a material and the like, and is greatly dependent on a user's know-how.

However, a sequence program in the injection molding machine is prepared in advance by a manufacturer, and is assembled in advance in a ROM and the like in a controller of the injection molding machine. Accordingly, the sequence program is unchangeable in spite of a shape of the mold, a type of the material and the like. As a result, it is actually difficult for the user to perform a control other than the controls according to the assembled sequence program.

Moreover, in order to overcome such a problem, there is a case that the user requests the manufacturer to specially modify the sequence program. However, not only it takes long time to use the injection molding machine with the modified sequence program, but also a man power and a cost are necessary for a programming, and further, a generality is lost because of the modification, so that an exceptional correspondence is required. After all, the user is forced to perform the molding based on a compromised molding operation which is different from the molding operation which is desired truly. Therefore, there is a limit on improvement of molding quality.

SUMMARY OF THE INVENTION

It is, therefore, an object of the present invention to provide an injection molding machine in which a user can make on occasion an original user program to which his know-how to the like are added and obtain a high quality molding in which he desires.

It is another object of the present invention is to provide an injection molding machine for performing a programming easily and with a low cost by using the user's own injection molding machine.

To attain these objects, in the present invention, an injection molding machine 1 for controlling various molding conditions based on a stored sequence program comprises a storing function portion 2 composed of a first memory portion M1 for storing in advance a standard program Ps that becomes standard of a sequence program and a second memory portion M2 having one or more memory areas into which a user program Pu . . . to be interrupted in the standard program Ps can be written, a user program making portion 3 that can make the user program Pu . . . by indicating a process of making the user program Pu interrupt into the standard program Ps, and a controlling function portion 4 for writing the made user program Pu . . . into the memory area in the second memory portion M2 and executing both of the standard program Ps and the user program Pu . . . interrupted in to the standard program Ps at the time of the molding operation.

In this case, each of the memory areas in the second memory portion M2 is set in response to the process of capable of making the user program Pu . . . interrupt into the standard program Ps. Further, a rewritable nonvolatile memory can be used in the second memory portion M2. On the other hand, the user program making portion 3 is adapted to display on a display 5 input formats F1, F2, F3 . . . for making the user program Pu . . . , and to make the user program Pu . . . by inputting data from an input apparatus, such as a keyboard 6 and the like, in accordance with the displaying mentioned above. The user program Pu . . . is made in a subroutine form.

As a result, unless the user program is made, the memory area in the second memory portion M2 is empty, and the user can perform a standard molding operation based on the standard program Ps. On the other hand, in a case where the user desires to perform a control according to an originally processing content in addition to the control based on the standard program Ps, he can make the user program Pu . . . by indicating the process of making the user program Pu . . . interrupt into the standard program Ps, with the user program making portion 3. In this case, for example, if the input formats F1 . . . for making the user program Pu . . . are displayed on the display 5, and if the data is inputted from the input apparatus, such as the keyboard 6 and the like, in accordance with the displaying mentioned-above, the user can make the user program Pu . . . easily and surely. Further, the made user program Pu . . . is written into the memory area in the second memory portion M2 by the controlling function portion 4. In this way, the user can make an original user program to which his know-how and the like are added.

Then, the standard program Ps and the user program Pu . . . interrupted in the standard program Ps are executed by the controlling function portion 4, at the time of the molding operation. That is, both of the standard program Ps and the added user program Pu . . . are executed Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

An optimal embodiment in accordance with the present invention will be exemplified hereinafter and described in detail with reference to the drawings.

Figure 1:
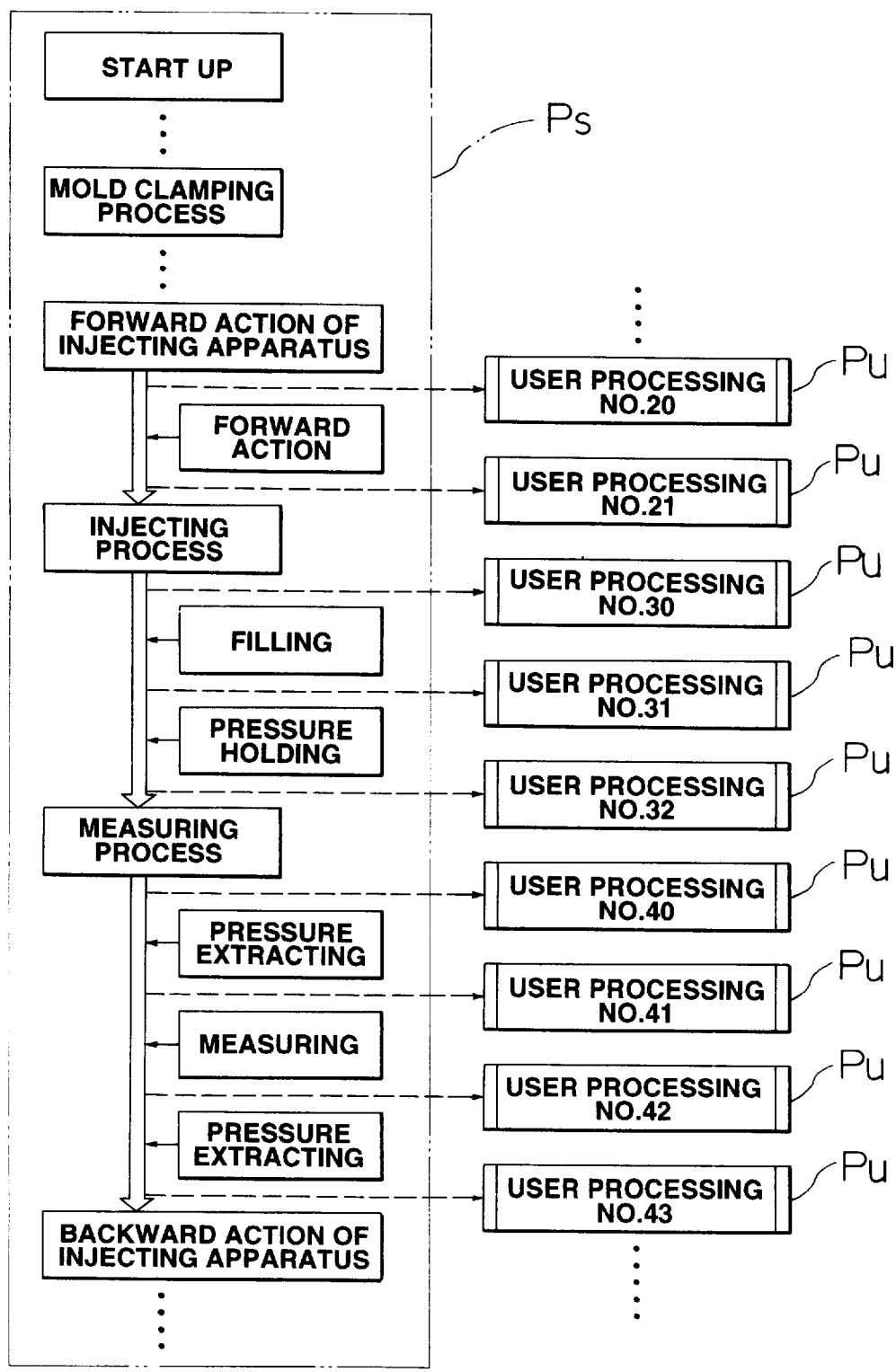
FIG. 1 is an explanatory view showing a relation between a standard program and a user program used in an injection molding program in accordance with the present invention.

At first, a construction of an injection molding machine 1 in accordance with the present invention will be described with reference to FIGS. 1 and 2.

Figure 2:
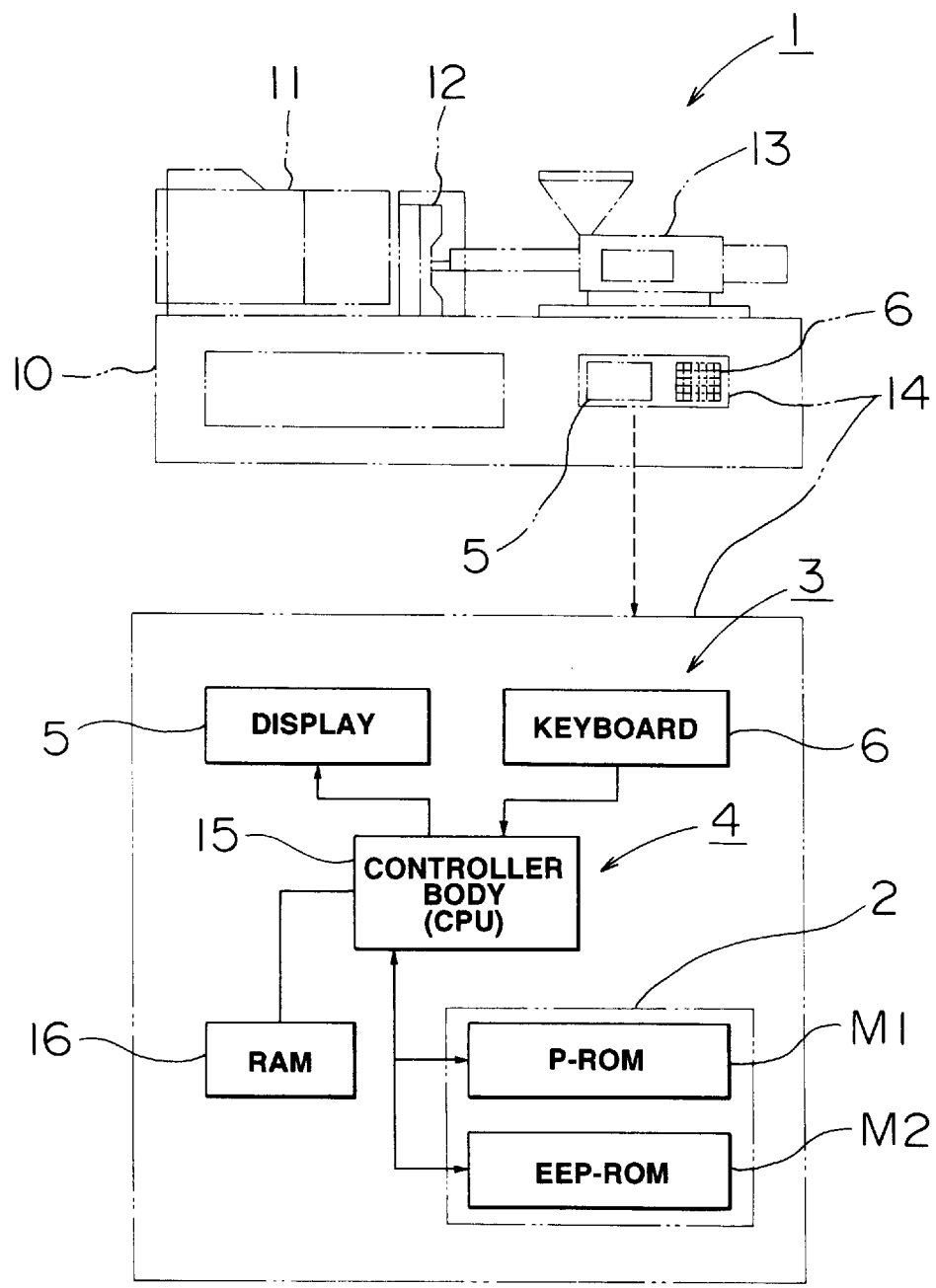
FIG. 2 is a whole appearance view including a main portion block construction of the same injection molding machine.
Figure 3:
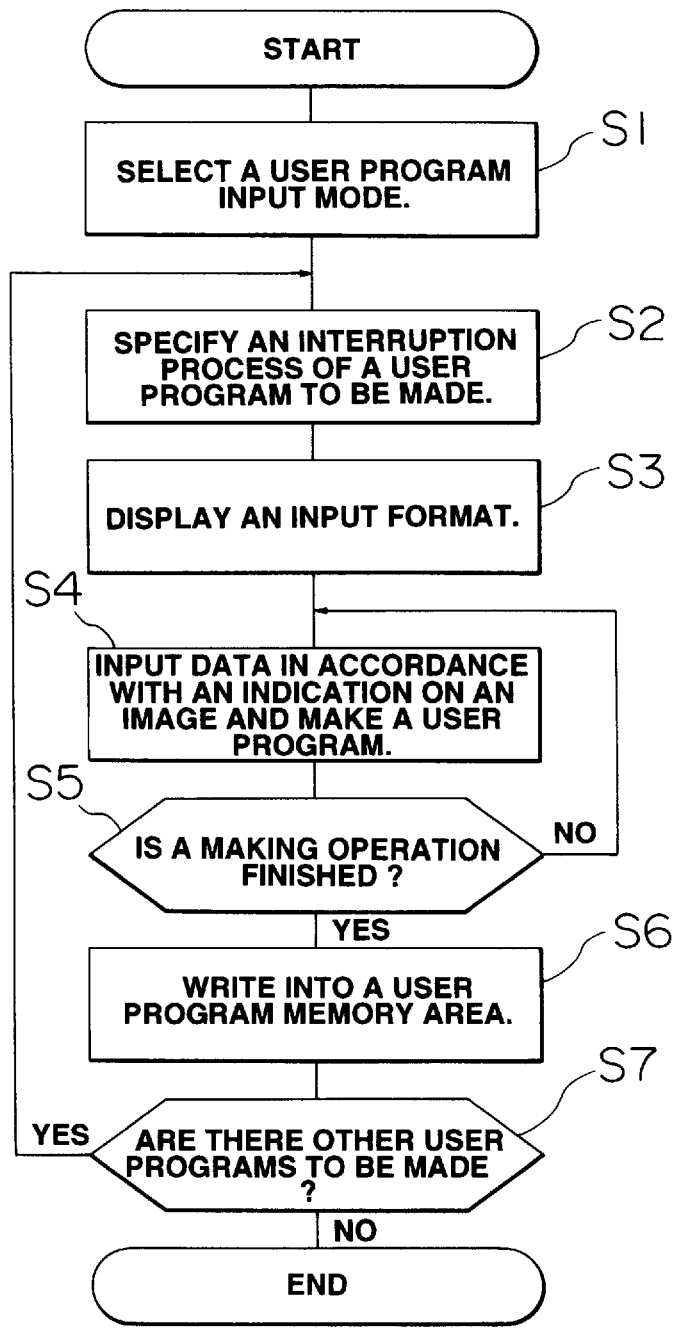
FIG. 3 is a flow chart showing a procedure of making a user program with the same injection molding machine.

FIG. 2 shows a schematic construction including a main portion of the injection molding machine 1. A whole appearance of the injection molding machine 1 is shown in an imaginary line. The injection molding machine 1 is provided with a machine base 10. A mold 12 fixed in a mold clamping apparatus 11 is disposed in front of an upper surface of the machine base 10. Further, an injection apparatus 13 which can move forward or backward with respect to the mold 12 is disposed in rear of the upper surface of the machine base 10. On the other hand, the machine base 10 is provided with a controller 14 having a computer function. The controller 14 is provided with a display 5 and a keyboard (generally, an input apparatus) 6 disposed on a side of the machine base 10. Hardwares necessary for a computer processing, such as a controller body (including a CPU and the like) 15, a RAM 16 and the like, are provided within the machine base 10.

The controller 14 is provided with a storing function portion 2, which comprises a first memory portion M1 and a second memory portion M2 managed by the controller body 15. In this case, for example, the first memory portion M1 uses a P-PROM and stores a standard program Ps which is a standard of a sequence program shown in a flow chart in FIG. 1. On the other hand, for example, the second memory portion M2 uses a rewritable nonvolatile memory (EEP-ROM) and comprises a plurality of memory areas into which a plurality of user programs Pu . . . (generally, one or more) is written, as shown in a subroutine form in FIG. 1. In this case, the memory areas in the second memory portion M2 are prepared as empty areas, and each of the memory areas is set corresponding to a process which can be interrupted in the standard program Ps. Each of processes is specified based on a process number. Further, for example, a different memory area in a single EEP-ROM may be used in the first memory portion M1 and the second memory portion M2.

Figure 4:
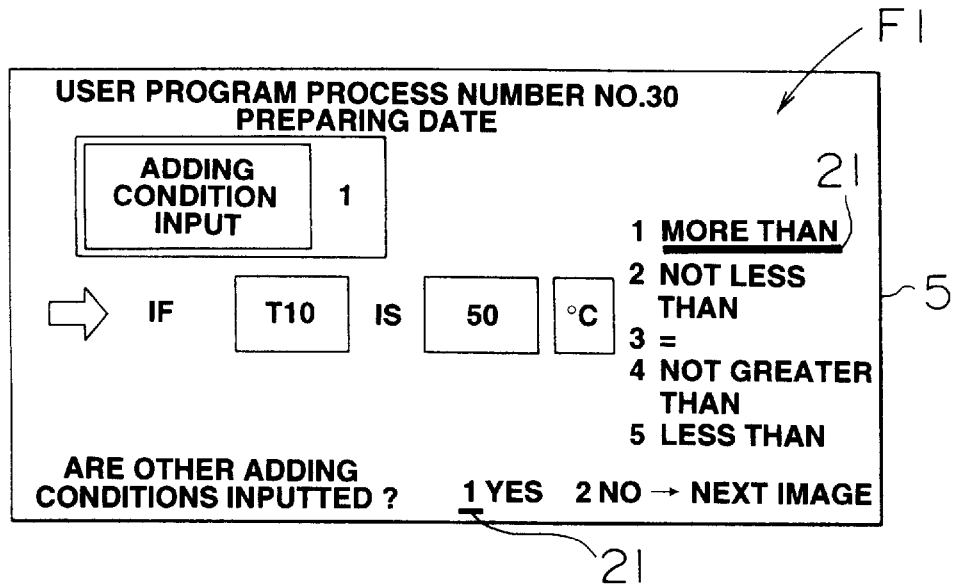
FIG. 4 is a pattern view of an input format displayed on a display when making the user program with the same injection molding machine.
Figure 5:
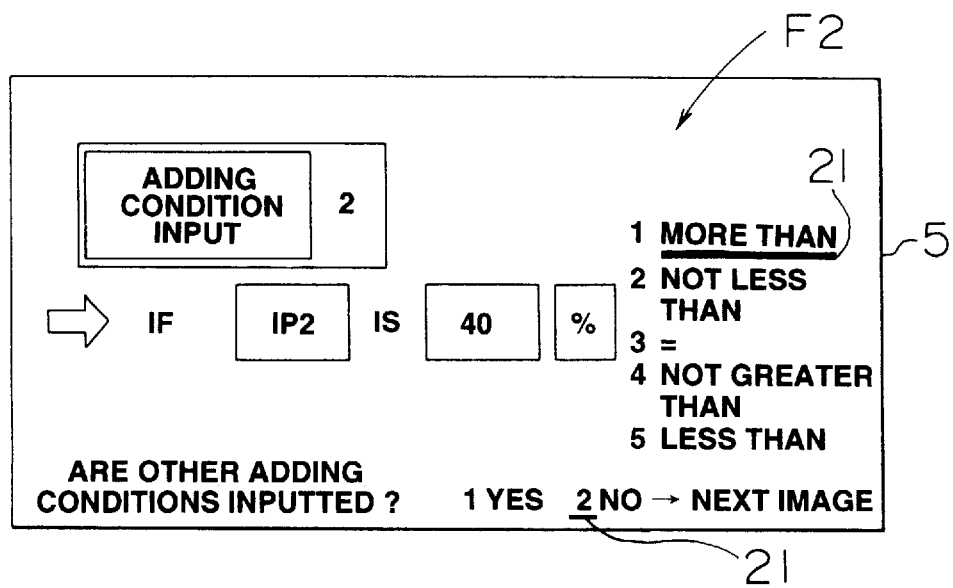
FIG. 5 is a pattern view of another input format displayed on the display when making the user program with the injection molding machine shown in FIG. 1.
Figure 6:
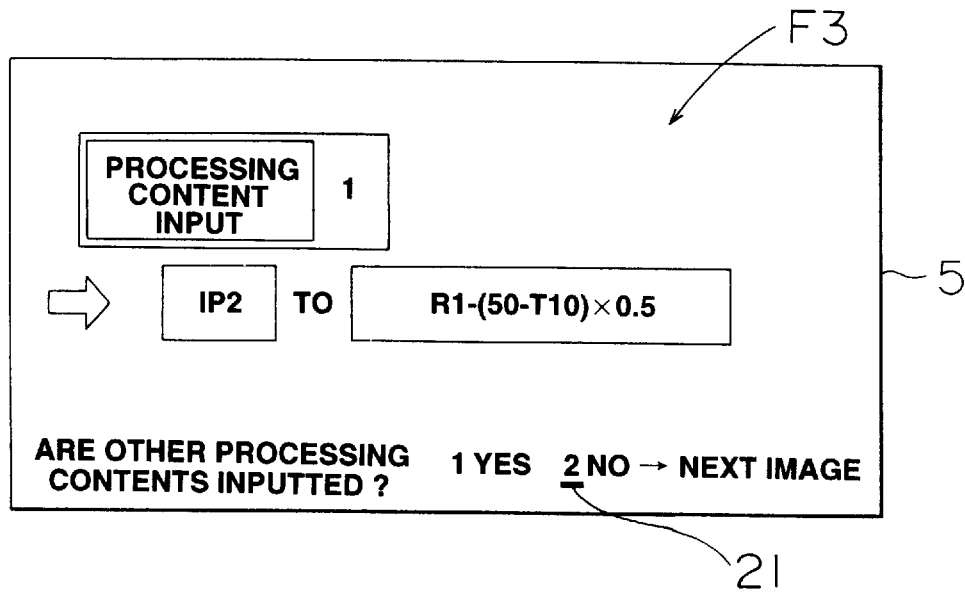
FIG. 6 is a pattern view of still another input format displayed on the display when making the user program with the same injection molding machine.

On the other hand, a user program making portion 3 which can make the user program is composed of hardwares, such as the display 5, the keyboard 6, the controller body 15 and the like, and, for example, a control program stored in the first memory portion M1 and the like. The user program making portion 3 has a function of making the predetermined user program Pu . . . by indicating a process of making the program Pu to interrupt into the standard program Ps. Actually, since input formats F1, F2, F3, . . . are displayed in turn on the display 5 as shown in FIGS. 4, 5, and 6 as an example, a user can make any of the user programs Pu . . . , by inputting a necessary data from the keyboard 6 in accordance with the displayed format.

Further, a controlling function portion 4 is composed of hardwares, such as the keyboard 6, the controller body 15, the RAM 16 and the like, and, for example, the control program stored in the first memory portion M1 and the like. The controlling function portion 4 has a function of writing a made user program Pu . . . into the memory area corresponding to the second memory portion M2, as well as a function of executing the standard program Ps and the user program Pu . . . interrupted in the standard program Ps when a molding operation is performed.

Next, a function (operation) of the injection molding machine 1 in accordance with the present invention will be described with reference to FIGS. 1 to 7.

At first, the standard program Ps which is standard for the sequence program is stored in advance in the first memory portion M1 in the storing portion 2 of the injection molding machine 1. The second memory portion M2 prepares as the empty program a plurality of the memory areas into which the user programs Pu . . . interrupted in the standard program Ps can be written. Thereby, basically, the user can perform a series of molding operations with the standard program Ps.

On the other hand, in a case where the user desires to perform a control based on an originally processed content, in addition to the standard control based on the standard program Ps, he can make the user program Pu . . . by indicating a process of making the user program Pu . . . interrupt into the standard program Ps. One example of a method of making the user program Pu will be described hereinafter with reference to FIGS. 3 to 7.

At first, the user operates the keyboard 6 to select [a user program input mode] (Step S1). Further, he indicates with the process number the process of making the user program to interrupt into the standard program Ps (Step S2). A case that the process number of [No.30] is indicated is shown in the embodiment. Accordingly, the input format F1 for making the user program Pu is displayed on the display 5, as shown in FIG. 4 (Step S3).

As a result, a target user program Pu can be made by inputting a necessary data in turn with the keyboard 6, in accordance with an indication displayed on the display 5 (Step S4). The embodiment exemplifies that a control of [if a mold temperature is not equal to 50° C., a holding pressure not only varies in proportional to the mold temperature under a predetermined condition, but also varies between 40 to 60% of a maximum determined value] is performed.

In this way, it is desirable that a programming for the user program Pu can be set in a constant programming form, for example, a simple input form of [if_is _, input _.] in such a manner that even the user who does not have a special programming knowledge can make the programming easily and surely in accordance with the displayed input formats F1 . . . .

At first, the input format F1 is displayed in a first image shown in FIG. 4. Accordingly, the user inputs a condition of [if T10 exceeds 50° C.] (adding condition) wherein T10 is the mold temperature. In this case, he uses the keyboard 6 and a cursor 21 to input a numeral, a symbol and the like to a corresponding blank portion and also to select an item displayed with the cursor 21. Further, since the other adding condition is necessary, the input format F2 is displayed in a second image shown in FIG. 5. Accordingly, he inputs the adding condition of [if IP2 exceeds 40%] wherein IP2 is a holding pressure. And, the input format F3 is displayed in a third image shown in FIG. 6. Accordingly, he inputs a processing content associated with the adding condition. That is, he inputs the processing content of [set IP2 to (R1−(T10−50)×0.5), wherein R1 is a standard setting holding pressure, 50 is the mold temperature, and 0.5 is a coefficient based on a user know-how.

Figure 7:
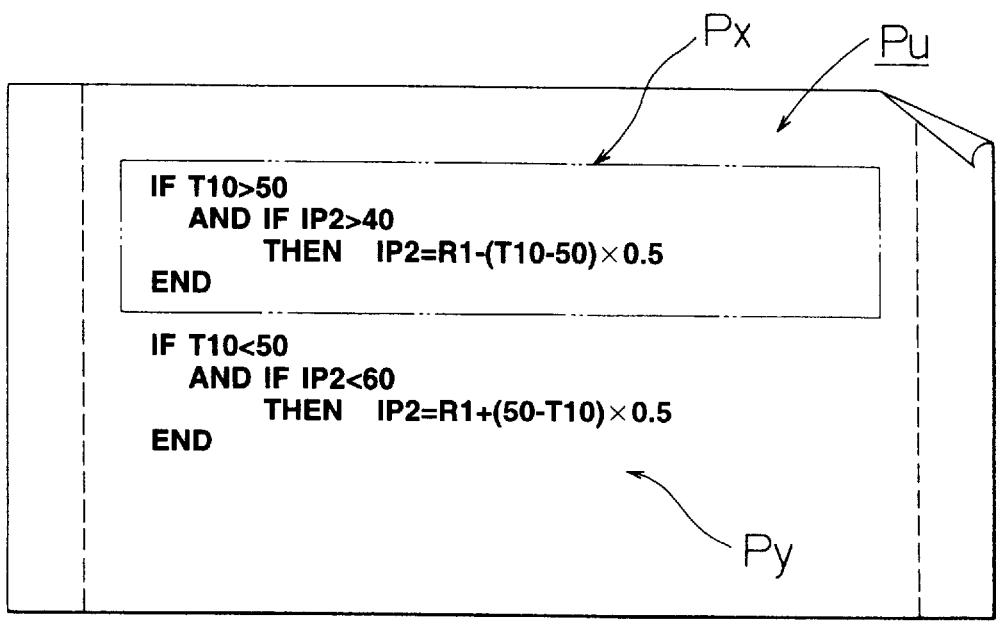
FIG. 7 is a view showing the user program made by the same injection molding machine.

FIG. 7 shows the user program Pu made in accordance with the embodiment. A program Px surrounded by an imaginary line in FIG. 7 is a part made by the input formats F1, F2 and F3 shown in FIGS. 4 to 6, respectively. In this way, the program itself is made automatically by the controller 14, if the user only inputs the necessary data in accordance with the input formats F1 . . . . Then, the whole of the target user program Pu is completed, if he repeats the similar procedure and makes a remaining program Py shown in FIG. 7.

Further, the user program Pu made in this way is written into the memory area corresponding to the process number of [No.30] in the second memory portion M2 indicated by the controlling function portion 4 (Steps S5 and S6). Then, the making process is finished unless there are other user programs to be made (Steps 7).

On the other hand, both of the standard program Ps and the user programs Pu . . . interrupted in the standard program Ps are executed by the controlling function portion 4 at the time of the molding operation. That is, the whole of the standard program Ps in which the user programs Pu . . . are added to predetermined processing positions is executed sequentially.

As a result, the user can make on occasion an original user program Pu to which his know-how and the like are added, obtain a high quality molding which he desire and also make the program easily and with a low cost.

While the embodiment has been described in detail as mentioned above, the present invention is not limited to such an embodiment. For example, the user program can be executed every molding cycle or at a unit of one operation. The embodiment exemplifies, as the user program, the example in relation to the process of modifying the holding pressure based on a cavity temperature. However, as other examples, it can be applied to various processes, such as a process in respect of a start-up performed at the time of actuating the injection molding machine, a process in respect of setting a setting value for a molding condition or increasing or decreasing to correct it, a process in respect of an automatic stop or return performed based on a molding defect signal, a process in respect of a scheduling at the time of exchanging a mold or a material, a process in respect of monitoring a molding product, a process in respect of monitoring the injection molding machine, a process in respect of actuating a mold core and a process of an air-blow to a mold. Furthermore, although the user program is stored in an inner memory of the controller mounted in the injection molding machine, the user program stored in an outer memory, such as an IC card, a flexible disk and the like, may be transferred to and stored in the inner memory (second memory portion), such as the EEP-ROM mentioned above and the like. Incidentally, a RAM and the like backed up by a battery may be used as the second memory portion.

On the other hand, although a case that the user program making portion is disposed in the controller mounted in the injection molding machine is exemplified, such a user program making portion may be disposed in an outside thereof. Thus, for example, the user program made by an outer computer and the like may be inputted, directly or through a data communication and the like, to the controller of the injection molding machine. Furthermore, in detail constructions, methods and the like, it may be changed on occasion without departing from the spirit and the scope of the present invention.

I claim:

1. An injection molding machine for controlling various molding operations based on a stored sequence program, comprising:

a storing function portion composed of a first memory portion for storing a standard program that becomes a standard of a sequence program which controls a clamping apparatus, a mold apparatus, and an injection apparatus of said injection molding machine; said storing function portion further includes a second memory portion having one or more memory areas into which a user program to be inserted into the standard program can be written;

a user program making portion including means for providing an injection molding program format, said user program making portion displays on a display said injection molding program input format for making the user program, and makes the user program by inputting data from an input apparatus comprising a keyboard, said user program is made in a subroutine form, said means for providing said injection molding program format includes at least one of optional data displayed on said display and blank portions in which at least one of symbols from said keyboard and said optional data are inserted and displayed in said blank portions, said injection molding program format includes conditional statements with molding parameters provided by a user; and a controlling function portion for writing the user program into the memory area in the second memory portion and executing both the standard program and the user program, wherein the user program is inserted into the standard program at the time of the molding operation.

2. The injection molding machine as defined in claim 1, wherein each of the memory areas in the second memory portion is set corresponding to a process capable of making the user program being inserted into the standard program.

3. The injection molding machine as defined in claim 1, wherein a rewritable nonvolatile memory is used in said second memory portion.

4. The injection molding machine as defined in claim 2, wherein a rewritable nonvolatile memory is used in said second memory portion.

5. The injection molding machine of claim 1, wherein said injection molding program format includes parameters of at least one of a standard setting holding pressure, molding temperature, holding pressure, start-up actuation of the injection molding machine, a molding defect signal, actuation of a mold core, molding coefficient, filling of a mold, measuring of injection materials, mold clamping, and air-blowing in a mold.

6. The injection molding machine of claim 1, wherein said injection molding program format repeats displays to form multiple subroutines.

7. The injection molding machine of claim 3, wherein said second memory portion includes at least one of an EEPROM, an IC card, a flexible disk, and a RAM with a battery.

8. The injection molding machine of claim 1, wherein said first memory portion includes at least one of a P-PROM and EEPROM.

9. The injection molding machine of claim 1, wherein said first memory portion and said second memory portion are disposed in one EEPROM.

10. The injection molding machine of claim 1, wherein said controlling function portion includes at least one of a central processing unit and a RAM.

* * * * *